(12) United States Patent
Koppich et al.

(10) Patent No.: US 7,478,316 B2
(45) Date of Patent: Jan. 13, 2009

(54) DOCUMENT MANAGEMENT SYSTEM FOR TRANSFERRING A PLURALITY OF DOCUMENTS

(75) Inventors: George Koppich, Palos Verdes Est., CA (US); Lenin Babu, Lake Forest, CA (US); Carl Byington, Blue Jay, CA (US)

(73) Assignee: Toshiba Tec Kabushiki Kaisha (JP)

( * ) Notice: Subject to any disclaimer, the term of this patent is extended or adjusted under 35 U.S.C. 154(b) by 256 days.

(21) Appl. No.: 10/269,572

(22) Filed: Oct. 10, 2002

(65) Prior Publication Data

US 2003/0200503 A1 Oct. 23, 2003

Related U.S. Application Data

(63) Continuation-in-part of application No. 10/125,856, filed on Apr. 19, 2002.

(51) Int. Cl.
*G06N 3/00* (2006.01)
(52) U.S. Cl. ..................................... 715/200
(58) Field of Classification Search ................. 715/500, 715/530, 513, 517, 523, 201, 202, 203, 204, 715/200; 707/203
See application file for complete search history.

(56) References Cited

U.S. PATENT DOCUMENTS

| | | | |
|---|---|---|---|
| 5,291,405 A * | 3/1994 | Kohari .................... | 715/500 |
| 5,423,034 A | 6/1995 | Cohen-Levy et al. | |
| 5,666,490 A | 9/1997 | Gillings et al. | |
| 6,009,442 A | 12/1999 | Chen et al. | |
| 6,081,810 A | 6/2000 | Rosenzweig et al. | |
| 6,088,696 A | 7/2000 | Moon et al. | |
| 6,092,090 A * | 7/2000 | Payne et al. ............. | 715/530 |
| 6,108,100 A * | 8/2000 | McVey et al. ............ | 358/1.16 |
| 6,119,137 A | 9/2000 | Smith et al. | |
| 6,253,217 B1 | 6/2001 | Dourish et al. | |
| 6,324,551 B1 * | 11/2001 | Lamping et al. ............ | 715/500 |
| 6,370,538 B1 | 4/2002 | Lamping et al. | |
| 6,897,971 B1 * | 5/2005 | Marshall et al. ............ | 358/1.15 |
| 2001/0014908 A1 | 8/2001 | Lo et al. | |
| 2002/0042815 A1 * | 4/2002 | Salzfass et al. ............ | 709/206 |
| 2002/0065848 A1 * | 5/2002 | Walker et al. ............. | 707/511 |
| 2003/0167191 A1 * | 9/2003 | Slabonik et al. ............ | 705/4 |

FOREIGN PATENT DOCUMENTS

| | | |
|---|---|---|
| EP | 0 442 054 A2 | 8/1991 |
| EP | 1 087 306 A2 | 3/2001 |
| WO | WO 02/25927 A1 | 6/2002 |

OTHER PUBLICATIONS

Mauriello, Ermelindo, "TCFS: Transparent Cryptographic File System," Aug. 1, 1997, <http:www.linuxjournal.com/article/2174>, pp. 1-7.*
Supplemental European Search Report, European Application No. 03 72 6392, Feb. 2, 2006.
TEE6E 6: "Feature Combination: Position Paper About Composability Issues in Object-Orientation", Proceedings ECOOP. Workshop on Composability Issues on Object-Orientation, Jul. 9, 1996, pp. 1-6, XP002151010.

* cited by examiner

*Primary Examiner*—Stephen S Hong
*Assistant Examiner*—Kyle R Stork
(74) *Attorney, Agent, or Firm*—Tucker Ellis & West LLP

(57) ABSTRACT

This invention is related to document management systems, and more particularly, to a document management system to automate transferring a plurality of documents or related data. The present invention is directed to a method and system for capturing electronic documents to a preselected data storage area comprising the steps of and means adapted for selecting a data storage area adapted for storage of electronic documents; and receiving, into the selected data storage area, electronic data representative of a plurality of electronic documents from at least one of a plurality of associated document systems.

22 Claims, 4 Drawing Sheets

DOCUMENT MANAGEMENT SYSTEM FOR TRANSFERRING A PLURALITY OF DOCUMENTS

This application is a continuation-in-part of pending U.S. patent application Ser. No. 10/125,856 entitled "Document Management System Rule-Based Automation" filed Apr. 19, 2002, the entirety of which is hereby incorporated by reference.

BACKGROUND OF THE INVENTION

This invention is related to document management systems, and more particularly, to a document management system to automate transferring a plurality of documents or related data.

Enterprises around the world are recognizing that information is the currency of their business. As such, there is tremendous value in ensuring that all corporate information, whether in structured or unstructured formats is captured, managed, and put to work in a meaningful and efficient way. Document management and content management solutions help organizations maximize the use of their unstructured data, which in turn helps maximize the use of their corporate knowledge. Unstructured data is information stored in text files, emails, documents, multimedia, etc.

Document management systems provide organizations with an ability to create centralized repositories, or libraries, containing all of the unstructured data they generate. Powerful search and retrieval tools make this information easily available for use and collaboration across the entire enterprise. These tools often provide security and version control capabilities. However, storing and retrieving large numbers of paper documents has, in the past, been an onerous task. Present document management systems solve some of the problems faced by organizations that use a manual document filing system alongside an electronic document system. These systems provide a method for combining both computer-generated image documents and paper documents in a secure document storage and retrieval system.

Document management systems provide a means for freeing up storage space and reducing the costs of paper document copying and distribution. They often provide multiple methods of adding documents and indexing information to the document management system while facilitating easy revisions, creation of new versions, annotation, and document sharing. One of the most important aspects of document management systems is their ability to eliminate time-consuming physical searches for misfiled or lost documents. Some document management systems allow users to save various types of documents in a single location (i.e. related client emails and Word documents in the same folder). Furthermore, they provide companies with an ability to back up all essential business documents, both scanned and computer-generated, and may integrate optical character recognition ("OCR") technology so that full text searches may be performed on scanned documents.

In popular operating system ("OS") platforms (e.g., Microsoft Windows family), a user navigates the local file system using the integrated OS file management system (e.g., Windows Explorer). Through the use of this tool, documents can be manipulated in a variety of ways, e.g., moved, copied, and deleted. Many computer users have grown accustomed to using integrated file management systems, and are thus reluctant to switch to another file management tool to perform these operations. Document management systems from third-party vendors generally provide enhanced file management systems.

In addition, a benefit of document management systems is that they facilitate collaboration. One such method is providing document distribution functionality so that one user can easily share documents with or send documents to other users, devices or systems. Unfortunately, the document distribution functionality of document management systems generally calls for a user to manually select an appropriate distribution function for each document in the document management system. It would be preferable, however, if document distribution functionality provided users with the ability to automate transferring a plurality of documents to a selected data storage area.

SUMMARY OF THE INVENTION

In accordance with the present invention, there is provided a document management system with an improved document distribution functionality.

Further, in accordance with the present invention, there is provided a document management system which provides users with the ability to automate transferring a plurality of documents to at least one data storage area.

Still further, in accordance with the present invention, there is provided a method for capturing electronic documents to a preselected data storage area comprising the steps of: selecting a data storage area adapted for storage of electronic documents; and receiving, into the selected data storage area, electronic data representative of a plurality of electronic documents from at least one of a plurality of associated document systems.

Still further, in accordance with the present invention, there is provided a system for capturing electronic documents to a preselected data storage area comprising: a memory adapted for defining therein a plurality of data storage areas, each of the data storage areas being adapted for storage of electronic documents; selection means adapted for selecting a designated data storage area from the plurality thereof; and means adapted for receiving, into the selected data storage area, electronic data representative of a plurality of electronic documents from-at least one of a plurality of associated document systems.

Advantages of the document management system of the present invention, include, but are not limited to, an improved document distribution functionality and the ability to automate transferring a plurality of documents to at least one selected data storage area. These and other advantages, aspects, and features will be understood by one of ordinary skill in the art upon reading and understanding the specification.

DETAILED DESCRIPTION OF THE PREFERRED EMBODIMENT

The document management system preferably provides access to a document management repository via a folder incorporated into the existing OS file structure. Although the present invention is described as enabling users to access document management functionality from a Microsoft Windows OS, it will be appreciated to those skilled in the art that the present invention is also suitably designed to interact with any OS, such as Unix, Linux, Macintosh or other OS. In one embodiment, the document management platform ("DMP") provides access to network-based documents via a browser, such as Internet Explorer or Netscape. In the presently preferred embodiment, a document repository managed by the DMP is represented as a folder or data storage area within an Internet Explorer window. The DMP permits a user to perform operations on the repository folder or data storage area, preferably insofar as the user has the appropriate access rights, as will be appreciated by those skilled in the art.

Figure 1:
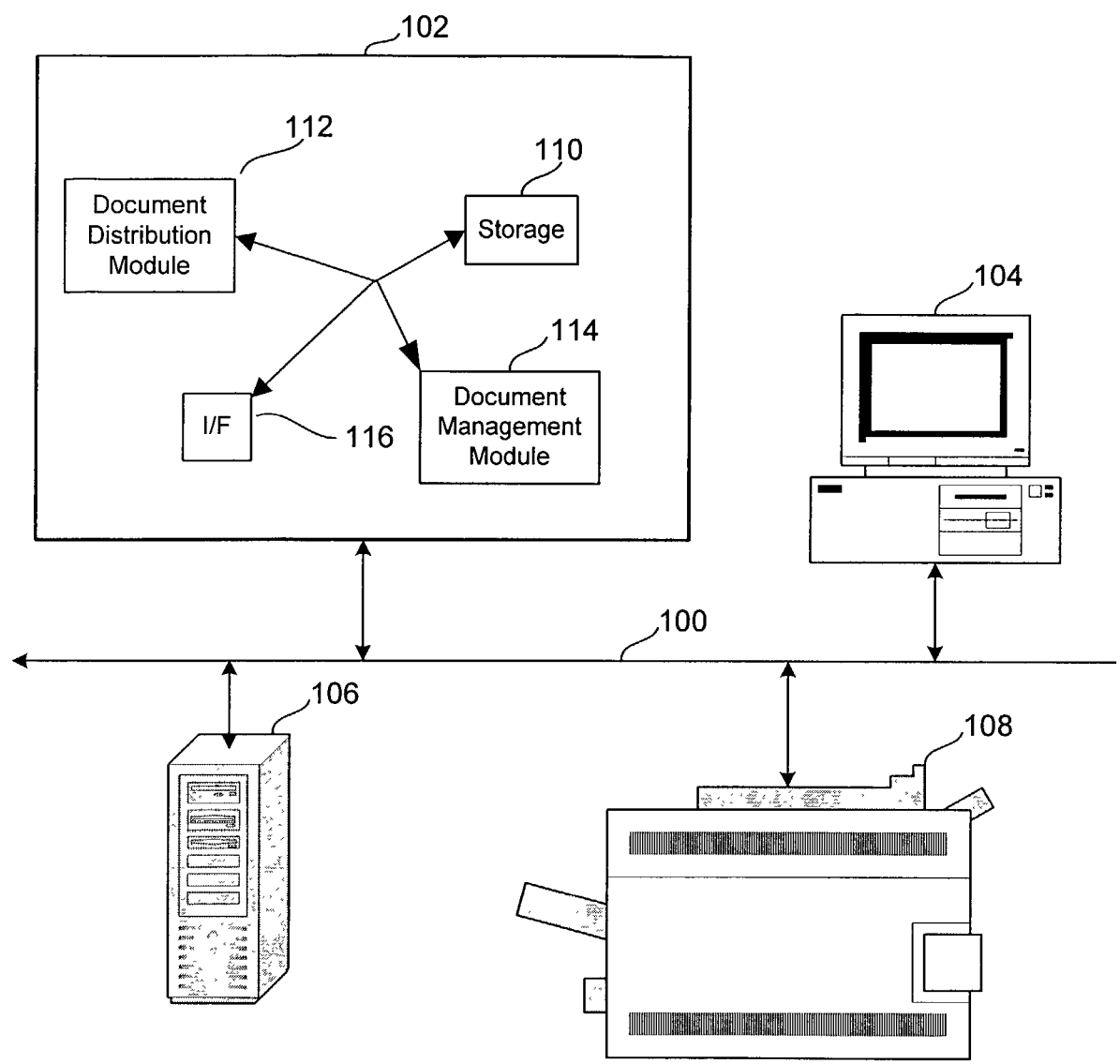
FIG. 1 illustrates an example of a network system for implementing the present invention.

Referring now to FIG. 1, an illustration of a network environment for practicing the present invention is provided. The system comprises a data transport network 100 illustrative of a LAN or WAN environment in which a preferred embodiment is provided, such as a packet-switched TCP/IP-based global communication network. The network 100 is suitably any network and is preferably comprised of physical layers and transport layers, as illustrated by a myriad of conventional data transport mechanisms like Ethernet, Token-Ring™, 802.11(b), or other wire-based or wireless data communication mechanisms as will be apparent to one of ordinary skill in the art. Connected to a data transport network 100 is a document management platform ("DMP") 102. In the presently preferred embodiment, the DMP preferably is a plug-n-play device having a hardware component consisting of a closed-box server that is easy to install, configure and support, and software components, both of which will be described in greater detail hereinbelow. The DMP is suitably operable to provide services to at least one computer 104, at least one image generating device 108, and/or at least one server 106 connected to network 100. It is suitably a document distribution solution with document management capabilities.

The DMP 102 suitably replaces or supplements existing facsimile, print and electronic mail servers, and preferably offers a more efficient method of transmitting, tracking and storing business-to-business documents. The DMP 102 is preferably a client/server system, which is suitably implemented in both single and collaborative corporate workgroups (although not limited to such environments) and designed to increase productivity and reduce costs by making document communications more simple and reliable. The DMP 102 suitably provides functionality enabling users to share documents and conduct collaborative work between various workgroups. Also connected to data transport network 100 is computer 104. The computer 104 is suitably either a server or client running on any OS, such as Windows NT, Windows 2000, Windows XP, Unix, Linux, Macintosh or other operating system. In addition, the computer 104 is suitably a thick client or thin client, as will be appreciated by those skilled in the art. For example, LAN environment, the DMP 102 provides services from a "thin" browser-based client. The disclosed DMP architecture is suitably accommodating for a "thick client" driver-based computer 104 and for a "thin client" browser-based computer 104.

At least one image generating device 108 is connected to data transport network 100. The image generating device is suitably a device such as a printer, facsimile machine, scanning device, copier, multi-function peripheral ("MFPs"), or other like peripheral devices. The image generating device 108 is suitably any networked image generating device as will be appreciated to one of ordinary skill in the art. The image generating device 108 preferably has an internal device controller suitably acting as a fully functional server with the necessary hardware and software that ensure proper operation of the image generating device as will be appreciated by those skilled in the art. In addition, the image generating device 108 preferably comprises internal storage, which is suitably a hard disk and random access memory ("RAM") as will be appreciated by those skilled in the art.

Optionally, a server 106 is also connected to data transport network. Because both the image generating device and the DMP suitably have server functionality, an additional server is not necessary to practice the present invention. However, corporate networks rarely have only one server, and often have more than two servers, wherein the servers may be configured to perform different tasks. The server 106 is suitably any fully functional server with the necessary hardware and software to ensure proper operation. The server 106 is suitably a database server configured for selective query support, selective data access, data archiving, and the like, an electronic mail server, an application server, or any server configured for performing a function across a network.

The DMP 102 preferably comprises a Document Distribution Module ("DDM") 112 and a Document Management Module ("DMM") 114. It should be noted that the DMP 102 is not limited to these particular modules, and suitably comprises additional modules for device management. The main function of the DMM 114 is to store documents in a central document repository and to facilitate user capability to modify documents, collaborate during document editing, and search and locate stored documents. The main function of the DDM 112 is to route jobs to their destinations such as image generating devices, servers, computers, a document repository, etc.

The DMP 102 also suitably comprises internal storage, in which at least one document repository or data storage area is suitably maintained. The DMP 102 preferably interfaces with data transport network 100 via network interface 116. Thus, the DMP 102, server 106, computer 104 and at least one image generating device 108 are in shared communication.

The computer 104 suitably represents either a thick client or and a thin client with general interfaces to the DMP 102. The computer 104 interfaces with the DDM 112 for document distribution to selected devices. The DDM 112 suitably reports back to the computer 104 the status of the documents forwarded to the DDM 112 for distribution.

The DMM 114 works with the DDM 112 and its components to enable users to quickly store and retrieve documents from a central repository, which is preferably stored in storage 111 on the DMP 102, but is also suitably stored on any storage device in communication with data transport network 100. The repository allows a user to share documents and conduct collaborative work between various workgroups. Users of the DMP 102 preferably utilize a browser-based Graphical User Interface (GUI) from a computer 104 to access documents stored in a repository. The DMP 102 preferably offers support for conventional browsers, e.g., Microsoft Internet Explorer and Netscape Navigator, through an internal web server which is accessible from a thin client via a browser using the HTTP protocol. A WebDAV (Web Distributed Authoring and Versioning) client suitably communicates with the web server utilizing HTTP and WebDAV protocols. WebDAV is a two-way protocol designed to support editing of Web sites and handling of meta data.

When the DMM 114 receives a document in image form, such as it would from a facsimile or scanning device, it suitably routes the image to the repository for storage. The image can also be forwarded to the DDM 112 for further routing to an output device, e.g., a printer. In addition, the image file is also suitably routed to other document management systems ("ODMP") of a remote appliance over the network, and preferably ODMA compliant. A document received via email device is suitably processed as text or an attachment to a message and forwarded to the DMM 114. Both an image and a processed email document can be routed to the printer, repository, and ODMP, and/or other output devices via the DDM 112.

Figure 2:
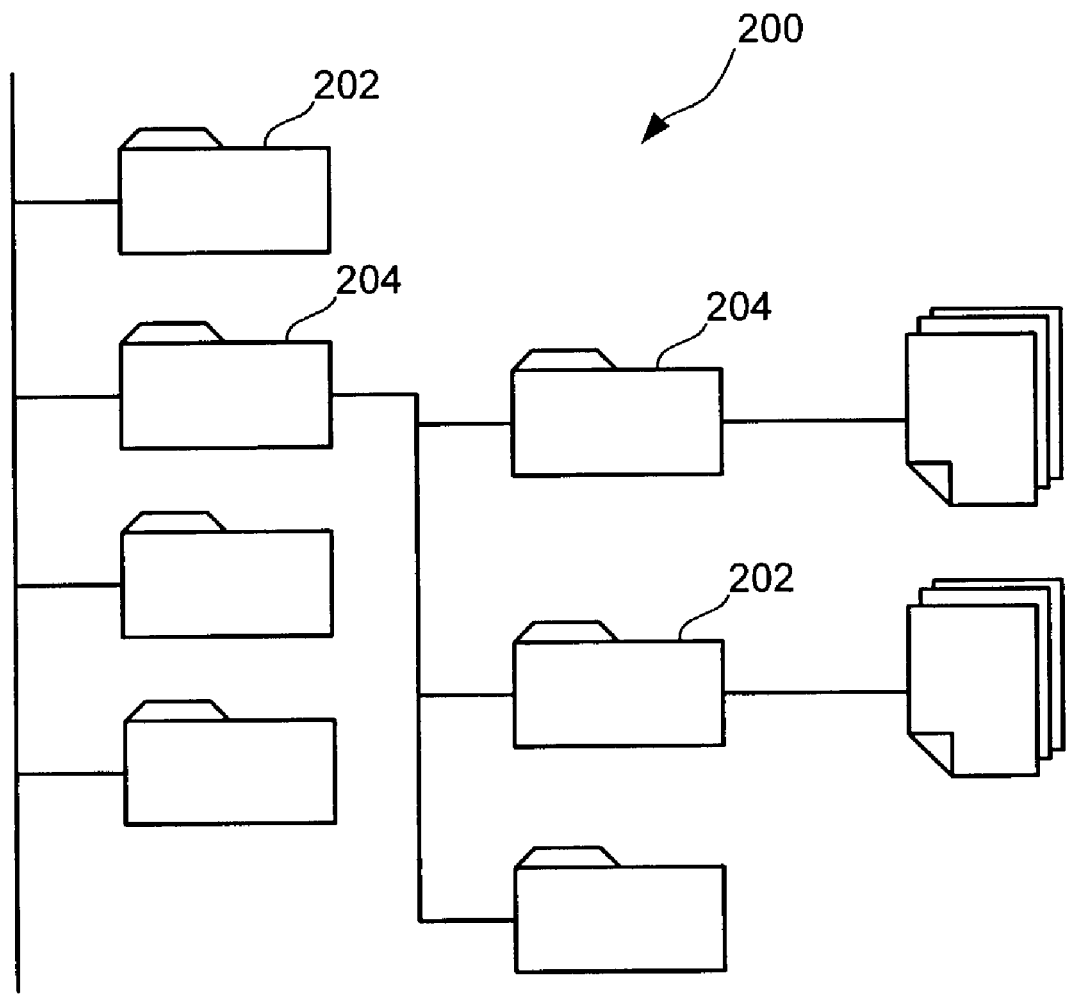
FIG. 2 illustrates a hierarchical tree structure of a repository in a document management system.

Referring now to FIG. 2, there is illustrated a hierarchical folder tree structure of a repository according to the present invention. The repository 200 is suitably comprised of a plurality of file folders or data storage areas. Users can browse through the repository 200 to access file folders and documents. Authorized users can create a hierarchical tree by creating new file folders and documents. Each file folder suitably contains both file subfolders and documents. A user is presented with file folders of two types: a private folder 202 and a group folder 204. The private folder 202 allows only the folder owner access this type of file folder. The folder owner has all rights on the objects contained in it. The private folder 202 is suitably created when an Administrator creates the user account. The group folder 204 is visible to users belonging to the group(s) assigned to this file folder. The operations that a user can perform on objects contained in the group folder 204 are limited to the access rights inherited from the respective group.

In one embodiment, the document management system of the present invention also includes a inbox repository or storage area to post incoming scanned image data, facsimiles, printed data, and the like. Such storages areas are suitably personal storage areas for each user or group or shared storage areas. The scanned images, facsimiles, printed data, and the like are posted to such storage areas based on the parameters provided by the user.

The document management system of the present invention allows a user to capture or move a plurality of documents from a document system into at least one repository or data storage area at the same time. In order to capture or move such documents, the user selects the repository or data storage area to receive the documents. The user identifies the appropriate data storage area by providing selected information about the data storage area in any manner known in the art. Such information includes, but is not limited to, data storage area location, data storage area name, access permission, user name associated with the data storage area, and user name password. The user is suitably either a system user or a guest account. The information provided by the user is then verified, and if so, the user is allowed to then transfer or move a plurality of documents from a document system to the selected data storage area. Preferably, only one data storage area may be selected for each user.

Preferably, the data storage area is selected from a private folder, a group folder, and an electronic inbox. Preferably, documents and directory tree structures are suitably captured into the data storage area. In the event that directory tree structures are received into the data storage area, only the documents stored in those directories are captured in the data storage area.

The document system is preferably a document management system, an image generating device, an electronic mail server, and an Internet server. For example, in one embodiment, the user captures or moves the plurality of documents from a local drive or network hard drive utilizing an interface suitably implemented to allow the user to browse such devices and for selecting the documents. This is also called an upload operation. The interface allows the user to then point to the destination storage area or folder, and perform copy or move operations to place the documents in the destination data storage area or folder.

In another embodiment, the user captures input/output from an image generating device, such as scanning device, printer, copying machines, facsimile machines, and multi-functional peripherals. For example, the paper documents scanned by the user are converted to an image format and are stored in the user's personal storage, or inbox folder. The user has an option of moving the documents from his/her inbox to a particular data storage area or folder in the repository.

Additionally, in another embodiment, the user captures from electronic mail as both text and an attachment. Documents sent via electronic mail is stored in the user inbox. The user has an option of moving the documents from the inbox to a particular data storage area or folder in the repository.

In another embodiment, the user captures documents or files from servers disposed on the Internet. The GUI provides the capability of specifying the URL of the source document(s) and the destination file folder. The DMP 202 then facilitates download of the specified documents for storage in the specified data storage area or folder.

In one embodiment, the document management system also includes means adapted for deselecting the desired data storage area so that the designated data storage area no longer receives documents or data from the document system. Until the user deselects the designated document area, all electronic documents and data are received from the document system into the designated document storage area. At this point, the user may stop the process or select another data storage area to receive documents or data.

In one embodiment, the document management system also includes means adapted for locking alternative data storage areas such that only the designated data storage area receives documents and data from the specified document system.

In another embodiment, the document management system provides a plurality of data storage areas or folders and each area or folder is associated with an individual user as discussed above. In this embodiment, a plurality of data storage areas are selected. Each selected data storage area or folder then receives documents or data for its associated individual user from the document system. Preferably, only one data storage area may be selected for each user. Preferably, in this embodiment, the document management system also includes means adapted for deselecting the desired data storage area for each individual user so that the designated data storage area no longer receives documents or data from the document system. Until the designated document area is deselected, all electronic documents and data are received from the document system into the designated document storage area associated with such individual user.

Figure 3A:
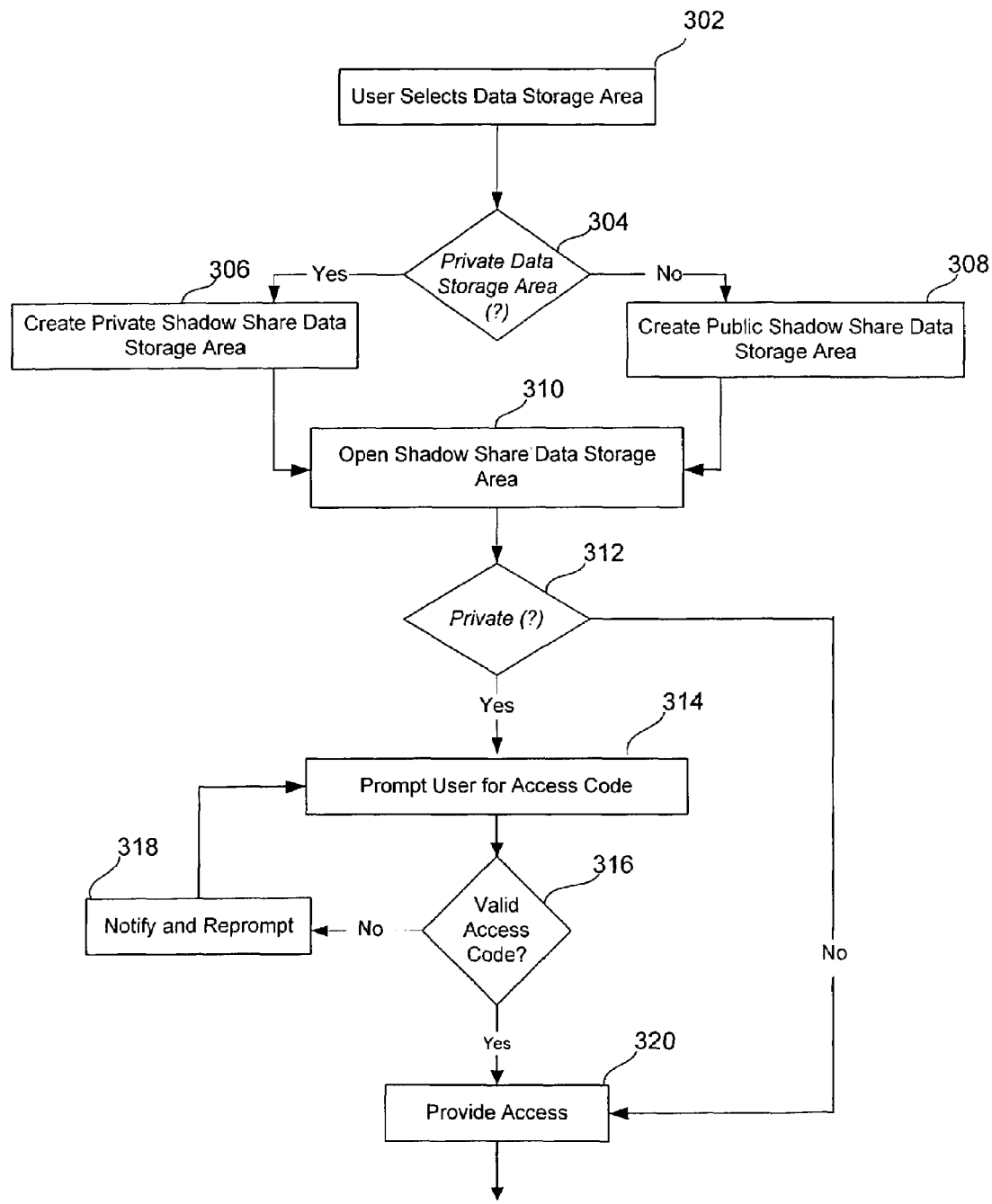
FIGS. 3a and 3b illustrate an overall block diagram of the subject invention for automating transferring a plurality of documents to at least one data storage area.
Figure 3B:
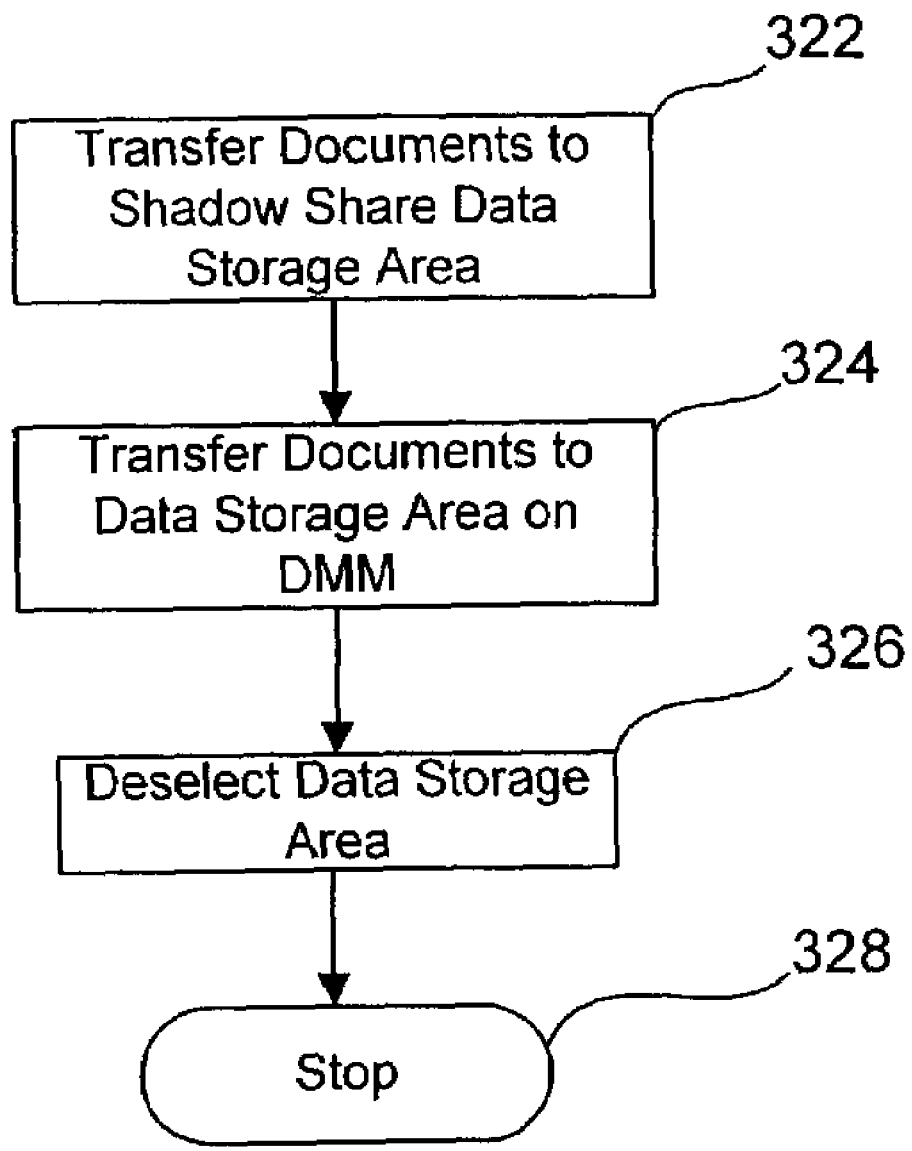

Referring now to FIGS. 3a and 3b, there is illustrated a flow chart of the process for moving a plurality of documents to at least one selected data storage area according to the present invention. Flow commences at process block 302 where the user selects the data storage area or folder to which the documents are to be transferred. Flow then proceeds to decision block 304 wherein a determination is made if the selected data storage area is a private data storage area. If the determination is positive, the process proceeds to process block 306 wherein a shadow share data storage area corresponding to the selected data storage area on the DMM is created on the server. If the determination is negative, the process proceeds to process block 308 wherein a shadow share data storage area corresponding to the selected data storage area on the server is created on the server.

Flow then proceeds to process block 310 wherein the shadow share data storage area is opened. A determination is then made at decision block 312 to determine if the shadow data storage area is a private data storage area. If the determination is negative, flow proceeds to process block 320. If the determination is positive, then process proceeds to process block 314 where the user is prompted to provide a username and password to gain access to the data storage area.

User rights to the folder are suitably assigned by an Administrator in accordance with the level of access provided to that particular user. For example, the user may be granted full access to his or her documents in private folders, yet restricted to a lesser read-only access to documents in the group folder. The Administrator can set the rights to any user, and to any document location. Note that the username/password login can be implemented as a single login coinciding with the network login, or as separate logins. Thus when the DMP 102 prompts the user for a username/password as a separate login procedure, flow progresses to decision block 316 wherein a determination is made whether the access code or login is valid.

A negative determination at decision block 316 means that the user entered invalid login information, which causes progress back to process block 318, where the user is again prompted to enter a valid access code or login.

A positive determination at decision block 316 means that the user entered a valid login, which causes progression to process block 320 wherein the user is provided access to the repository. The user is suitably granted access in accordance with the rights assigned by an Administrator and associated with the login information provided by the user.

Flow then continues to process block 322 wherein the user moves or copies a plurality of documents from the document system to the shadow share data storage area. At this point, progression flows to process block 324 wherein after a predetermined time, the documents are transferred from the shadow share data storage area to the corresponding data storage area located on the DMM.

Flow then continues to process block 326 wherein the user deselects the selected data storage container so that the data storage area no longer receives documents from the document system. The deselection of the data storage area may occur at any time. At this point, the user may select another data storage area to receive documents or stop the process as shown at 328.

Although system as described runs on a network appliance, it is appreciated that it can also run on other operating systems, for example, Linux (and other Unix operating systems), and OS by Apple Computers. Although the preferred embodiment has been described in detail, it should be understood that various changes, substitutions, and alterations can be made therein without departing from the spirit and scope of the invention as defined by the appended claims. It will be appreciated that various changes in the details, materials and arrangements of parts, which have been herein described and illustrated in order to explain the nature of the invention, may be made by those skilled in the area within the principle and scope of the invention as will be expressed in the appended claims.

What is claimed is:

1. A method for capturing electronic documents to a preselected data storage area comprising the steps of:
   receiving user identification data representative of an identity of an associated user;
   displaying, on an associated data display, indicia corresponding to each of a plurality of displayed data storage areas;
   receiving, from an associated user, storage selection data representative of a user selected storage area, selected from the plurality of displayed data storage areas, for a plurality of incoming electronic documents;
   selecting, in accordance with received storage selection data and user identification data, a data storage area from the selected displayed data storage area adapted for storage of the plurality of incoming electronic documents;
   testing the user selected storage area for a location within a preset private data storage area;
   creating a private shadow data storage area when a location is determined to be within the preset private data storage by the testing step;
   creating a public shadow data storage area when a location is determined to be outside of the preset private data storage area by the testing step;
   associating an input of a plurality of incoming document systems with the created data storage area in accordance with the storage selection data wherein the document systems include at least two different systems selected from a group consisting of image generating devices, electronic mail servers, Internet servers, and document management systems;
   receiving a plurality of electronic documents, each in its native format, from the plurality of associated document systems into the created shadow data storage after completion of the step of selecting;
   prompting for input of an access code after creation of a private shadow data storage area;
   validating a received access code; and
   routing, into the selected data storage area from the shadow data storage area, the plurality of received electronic documents.

2. The method for capturing electronic documents to a preselected data storage area of claim 1 wherein the storage selection data corresponds to a plurality of associated users.

3. The method for capturing electronic documents to a preselected data storage area of claim 1 wherein the step of receiving storage selection data further comprises the step of receiving, from the associated user, storage selection data representative of at least a second selected storage area for receipt of copies of received electronic documents.

4. The method for capturing electronic documents to a preselected data storage area of claim 1 further comprising the steps of:
   receiving, from an associated user, secondary storage selection data representative of a newly selected storage area for a plurality of associated, electronic documents;
   selecting, in accordance with received storage selection data and user identification data, a newly designated data storage area adapted for storage of the plurality of associated, electronic documents;
   testing the newly selected storage area for location within a preset private data storage area;
   creating a private shadow data storage area when a location is determined to be within the preset private data storage by the testing step; and
   creating a public shadow data storage area when a location is determined to be outside of the preset private data storage area by the testing step.

5. The method for capturing electronic documents to a preselected data storage area of claim 1 wherein the selected data storage area is selected from the group consisting of a private repository folder, a network repository folder, and an electronic inbox located on an associated server.

6. The method for capturing electronic documents to a preselected data storage area of claim 1 wherein the image generating devices include scanning devices, facsimile machines, copying machines, and multifunctional peripherals.

7. The method for capturing electronic documents to a preselected data storage area of claim 1 further comprising the step of locking alternative data storage areas from receipt of electronic data after completion of the step of selecting such that only one data storage area receives the electronic data.

8. The method for capturing electronic documents to a preselected data storage area of claim 1 wherein the data storage area further receives electronic data representative of directory information.

9. The method for capturing electronic documents to a preselected data storage area of claim 1 further comprising the step of deselecting the selected data storage area, wherein all electronic documents are received into the selected data storage area until the designated data storage area is deselected.

10. The method for capturing electronic documents to a preselected data storage area of claim 1 wherein a plurality of data storage areas are selected, wherein each data storage area is associated with an individual user and wherein each data storage area receives all electronic documents associated with the individual user.

11. The method for capturing electronic documents to a preselected data storage area of claim 10 further comprising the step of selectively deselecting the deselecting the selected data storage area for each individual user, wherein all electronic documents associated with each individual user are received into the selected data storage associated with such individual until the selected data storage are is deselected.

12. A system, including a processor, for capturing electronic documents to a preselected data storage area comprising:
    means adapted for receiving user identification data representative of an identity of an associated user;
    means adapted for displaying, on an associated data display, indicia corresponding to each of a plurality of displayed data storage areas;
    means adapted for receiving, from an associated user, storage selection data representative of a user selected storage area, from the plurality of displayed data storage areas, for a plurality of incoming, electronic documents;
    means adapted fro selecting, in accordance with received storage selection data and user identification data, a storage area from the selected displayed data storage area adapted for storage of the plurality of incoming, electronic documents;
    testing means adapted for testing the user selected storage area for location within a preset private data storage area;
    means adapted for creating a private shadow data storage area when a location is determined to be within the preset private data storage area by the testing means;
    means adapted for creating a public shadow data storage area when a location is determined to be outside of the preset private data storage area by the testing means;
    means adapted for associating an input of a plurality of incoming document systems with the created data storage area in accordance with the storage selection data wherein the document system includes at least to different systems selected from a group consisting of image generating device, electronic mail servers, Internet servers, and document management systems;
    means adapted for receiving a plurality of electronic documents, each in its native format, from the plurality of associated document systems after the selection of the data storage area;
    means adapted for prompting for input of an access code after creation of a private shadow data storage area;
    validation means adapted for validating a received access code; and
    means adapted for routing, into the selected data storage area from the created shadow data storage area, the plurality of received electronic documents.

13. The system for capturing electronic documents to a preselected data storage area of claim 12 wherein the storage selection data corresponds to a plurality of associated users.

14. The system for capturing electronic document to a preselected data storage area of claim 12 wherein means adapted for receiving storage selection data further comprises means adapted for receiving, from the associated user, storage selection data representative of at least a second selected storage area for receipt of copies of received electronic documents.

15. The system for capturing electronic documents to a preselected data storage area of claim 12 further comprising:
    means adapted for receiving, from an associated user, secondary storage selection data representative of a newly selected storage area for a plurality of associated, electronic documents;
    means adapted for selecting, in accordance with received storage selection data and user identification data, a newly designated data storage area adapted for storage of the plurality of associated, electronic documents;
    testing means adapted for testing the newly selected storage area for location within a preset private data storage area;
    means adapted for creating a shadow data storage area when a location is determined to be within the preset private data storage by the testing means; and
    means adapted for creating a public shadow data storage area when a location is determined to be outside of the preset private data storage area by the testing means.

16. The system for capturing electronic documents to a preselected data storage area of claim 12 wherein the selected data storage area is selected from the group consisting of a private repository folder, a network repository folder, and an electronic inbox located on an associated server.

17. The system for capturing electronic documents to a preselected data storage area of claim 12 wherein the image generating devices include scanning devices, facsimile machines, copying machines, and multifunctional peripherals.

18. The system for capturing electronic documents to a preselected data storage area of claim 12 further comprising means adapted for locking alternative data storage areas from receipt of electronic data after completion of the step of selecting such that only one data storage area receives the electronic data.

19. The system for capturing electronic documents to a preselected data storage area of claim 12 wherein the data storage area further receives electronic data representative of directory information.

20. The system for capturing electronic documents to a preselected data storage area of claim 12 further comprising means adapted for deselecting the selected data storage area, wherein all electronic documents are received into the selected data storage area until the designated data storage area is deselected.

21. The system for capturing electronic documents to a preselected data storage area of claim 12 wherein a plurality of data storage areas are selected, wherein each data storage area is associated with an individual user and wherein each data storage area receives all electronic documents associated with the individual user.

22. The system for capturing electronic documents to a preselected data storage area of claim 21 further comprising means adapted for selectively deselecting the deselecting the selected data storage area for each individual user, wherein all electronic documents associated with each individual user are received into the selected data storage associated with such individual until the selected data storage are is deselected.

* * * * *